No. 771,919. PATENTED OCT. 11, 1904.
D. A. MURPHY.
CLUTCH.
APPLICATION FILED APR. 8, 1904.
NO MODEL. 2 SHEETS—SHEET 1.

Witnesses

David A. Murphy
Inventor
By Attorney

No. 771,919. PATENTED OCT. 11, 1904.
D. A. MURPHY.
CLUTCH.
APPLICATION FILED APR. 8, 1904.
NO MODEL. 2 SHEETS—SHEET 2.

Witnesses

David A. Murphy
Inventor
By Attorney

No. 771,919.                                                  Patented October 11, 1904.

UNITED STATES PATENT OFFICE.

DAVID ALLEN MURPHY, OF MONTREAL, CANADA.

CLUTCH.

SPECIFICATION forming part of Letters Patent No. 771,919, dated October 11, 1904.

Application filed April 8, 1904. Serial No. 202,220. (No model.)

*To all whom it may concern:*

Be it known that I, DAVID ALLEN MURPHY, of the city of Montreal, Province of Quebec, Canada, have invented certain new and useful Improvements in Clutches; and I do hereby declare that the following is a full, clear, and exact description of the same.

My invention relates particularly to slip-clutches; and it has for its object to provide a clutch which will deliver any desired predetermined maximum torque within the capacity of the machine in connection with which it acts, and when it is delivering this torque and the machine or part driven should be subjected to a load calling for a torque in excess of that predetermined the clutch will slip and deliver the predetermined torque and no more.

The invention may be said briefly to consist of a collar fixed to and rotatable with a shaft, which may or may not be the prime mover, a casing carried loosely by such shaft, a pair of shoes adapted to be adjustably yieldingly pressed against the inside wall of the casing and impart movement thereto or receive movement therefrom, and a swinging connection between said collar and shoes, such swinging connection being preferably adapted to act in either direction.

For full comprehension, however, of my invention reference must be had to the accompanying drawings, forming a part of this specification, wherein like symbols indicate corresponding parts, and in which—

Figure 1:
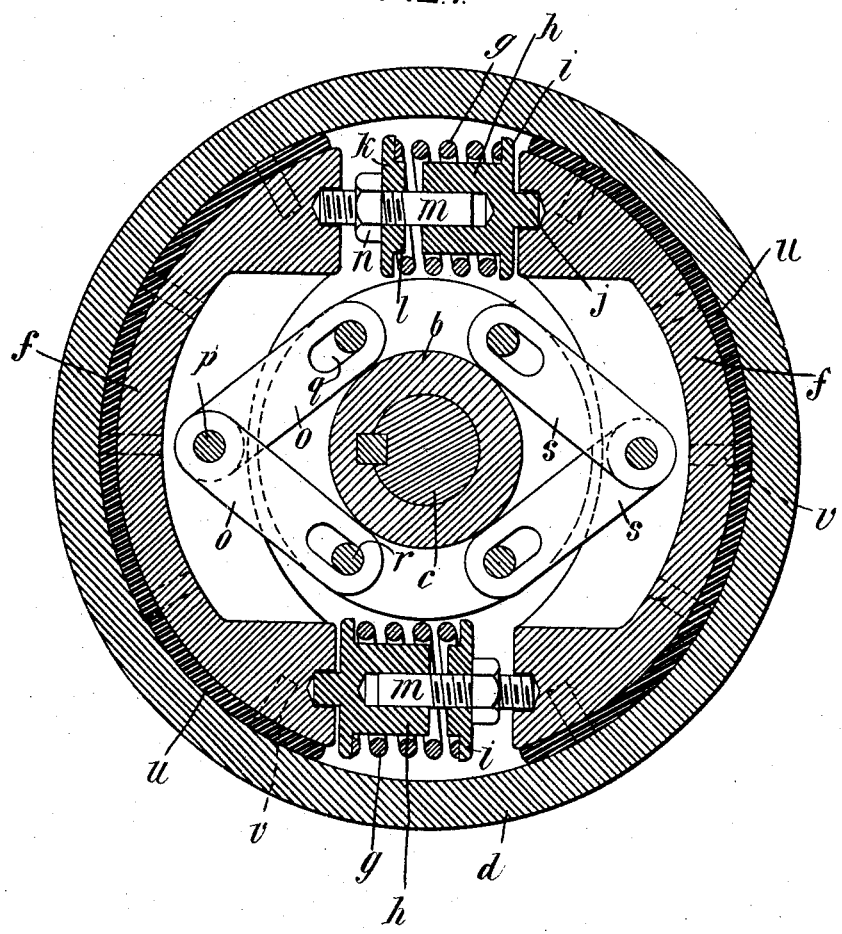
Figure 2:
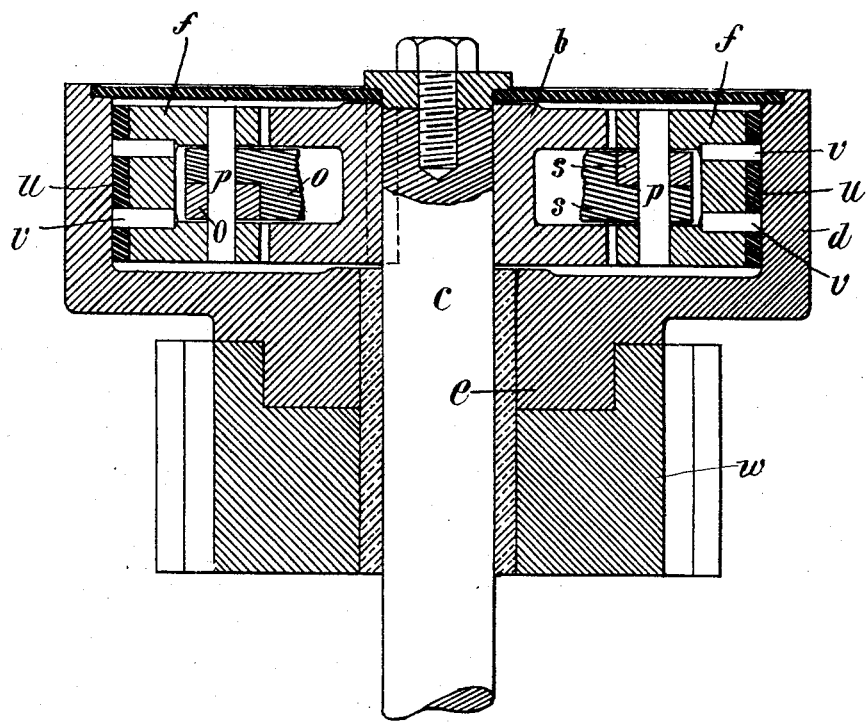

Figures 1 and 2 are sectional views of my improved slip-clutch, the view of Fig. 1 being taken on a line extending at right angles to the axis and the view of Fig. 2 being taken on an axial line.

A collar $b$ is fixed upon a shaft $c$ to move therewith, and a casing $d$, formed with a hub $e$, is carried loosely upon such shaft in position to encircle the collar. Either the collar or casing may be the prime mover. A pair of shoes $f$ are located between the collar and casing, and their faces are caused to bear upon the interior of said casing by pressure means located between the shoes. The pressure means I prefer to use consists of a pair of variable or adjustable pressure devices, each consisting of an expansile helical spring $g$, inclosing a core $h$, having a flange $i$ at one end which overlaps the end of the spring and an axial teat $j$, which fits into a hole in one end of one of the shoes, while a centrally-perforated washer $k$ extends across the opposite end of the spring and is formed with its middle portion increased in thickness, as at $l$, to project slightly into the spring. The core or, as it may be termed, "retainer" and the washer are localized relatively to one another and the tension of the spring adjusted by a stud $m$, having one end plane and inserted in a boring in the retainer axially thereof and its opposite end screw-threaded and passed through the perforation in the washer and inserted into a hole in one end of the other shoe, while a nut $n$ on the screw-threaded end of the stud enables the spring to be compressed or released and the tension thereof thereby varied. The swinging connection between the collar $b$ and the shoes consists of a pair of rods $o$, pivoted at a common point by pin $p$ to one of the shoes and having their opposite ends longitudinally slotted, as at $q$, and pivotally connected by pins $r$ to the collar at opposite sides of a line extending radially from the shaft through pin $p$. A second pair of like rods $s$ are similarly connected to the collar at the diametrically opposite side of the shaft and to the other shoe.

The pressure devices are preferably disposed to face in opposite directions for the purpose of balancing the clutch.

I prefer to face the shoes with fibrous material, preferably wood fiber, and these facings $u$ are secured in place by dowel-pins $v$ or other means, as described.

A gear-wheel $w$ is illustrated in Fig. 2 as an example of means to receive or deliver torque from or to my improved clutch.

Operation: When the shaft $b$ is the prime mover, it exerts a pull on the connecting-rods $o$ or $s$, according to the direction in which the shaft rotates. These rods in turn exert a pull on the shoes $f$ in such a direction that there are two component forces, one tangential and one radial. The tangential force through the friction of the contact between the shoes and the casing $d$ causes the casing to be rotated in the same direction as the shaft. The torque or twisting moment exerted on the casing $d$ is limited in that at a certain pull on the connecting-rods $o$ or $s$ the radial force will be sufficient to overcome the tension of the springs $g$ and the centrifugal force of the shoes $f$, thereby drawing the shoes slightly toward the shaft, thus reducing the frictional contact between the shoes and casing. The slots in the connecting-rods $o$ and $s$ cause stress in rods $o$ in one direction only and in rods $s$ in the opposite direction only while the adjustment of springs $g$ enables different degrees or strength of torque to be accommodated.

It is obvious that my improved slip-clutch will deliver any desired predetermined maximum torque within the capacity of the machine or part in connection with which it acts, and while it is delivering this predetermined torque should the machine or part be subjected to a load calling for a torque in excess of that predetermined the clutch will slip and although delivering the predetermined torque will deliver no more.

What I claim is as follows:

1. In a clutch comprising a driving part, and a driven part, means for causing the driving part to deliver to the driven part a predetermined maximum torque and means adapted to control the last-mentioned means and for restricting the said torque to the maximum degree predetermined.

2. In a clutch comprising a driving part, and a driven part of the clutch, means for causing the driving part to deliver to the driven part a predetermined maximum torque in either direction and means adapted to control the last-mentioned means and for restricting the said torque to the maximum degree predetermined.

3. In a clutch comprising a member constituting the driving part, and a member constituting the driven part of the clutch, means for causing the driving part to deliver to the driven part a predetermined maximum torque in either direction and means adapted to control the last-mentioned means and for restricting the said torque to the maximum degree predetermined, and means for varying said first-mentioned means to deliver a maximum torque of greater or less degree.

4. In a clutch comprising a driving part of the clutch, and a driven part of the said clutch, means for causing the driving part to deliver to the driven part a predetermined maximum torque means adapted to control the last-mentioned means and for restricting the said torque to the maximum degree predetermined, and means for varying said driving part to deliver a maximum torque of greater or less degree.

5. The combination with a shaft, of a clutch comprising a member secured rigidly upon said shaft to rotate therewith, a second member carried loosely by said shaft adjacent to said first-mentioned member one of said members constituting the driving part and the other member constituting the driven part of the said clutch, means for causing the driving part to deliver a predetermined maximum torque to the driven part and means adapted to control the last-mentioned means and for restricting said torque to the maximum degree predetermined.

6. The combination with a shaft, of a clutch comprising a member secured rigidly upon said shaft to rotate therewith, a second member carried loosely by said shaft adjacent to said first-mentioned member, one of said members constituting the driving part and the other member constituting the driven part of the said clutch, means for causing one of said parts to deliver a predetermined maximum torque to the other part and means adapted to control the last-mentioned means and for restricting said torque to the maximum degree predetermined, and means for adjusting said last-mentioned means to deliver a maximum torque of greater or less degree.

7. The combination with a shaft, of a clutch comprising a collar fixed rigidly upon said shaft, an annular member encircling said collar and carried loosely by said shaft, friction mechanism located between said collar and the interior of said annular member, means for causing said collar to deliver to or receive from the annular member a predetermined maximum torque and means adapted to control the last-mentioned means and for restricting said torque to the maximum degree predetermined.

8. The combination with a shaft, of a clutch comprising a collar fixed rigidly upon said shaft, an annular member encircling said collar and carried loosely by said shaft, friction mechanism located between said collar and the interior of said annular member, means for causing said collar to deliver to or receive from the annular member a predetermined maximum torque and means adapted to control the last-mentioned means and for restricting said torque to the maximum degree predetermined, said means being adjustable to vary the degree of the maximum torque delivered.

9. The combination with a shaft, of a clutch comprising a collar fixed rigidly upon the shaft, a casing encircling said collar and carried loosely by the shaft, a pair of shoes located between said collar and the interior of said casing with their bearing-faces adjacent to said casing, and means for causing said shoes to deliver to or receive from the casing a predetermined maximum torque, and means adapted to control the last-mentioned means and for restricting the said torque to the maximum degree predetermined.

10. The combination with a shaft, of a clutch comprising a collar fixed rigidly upon said shaft, a casing encircling said collar and carried loosely by said shaft, a pair of shoes located between said collar and casing, yielding resistance means exerting pressure upon said shoes and maintaining them yieldingly in contact with the interior of the casing, and retracting means carried by said collar and exerting a radial force upon said shoes, for the purpose set forth.

11. The combination with a shaft, of a clutch comprising a collar fixed rigidly upon said shaft, a casing encircling said collar and carried loosely by said shaft, a pair of shoes located between said collar and casing, yielding resistance means exerting pressure upon said shoes and maintaining them yieldingly in contact with the interior of the casing, means for varying said pressure, and retracting means carried by said collar and exerting a radial force upon said shoes, for the purpose set forth.

12. The combination with a shaft, of a clutch comprising a collar fixed rigidly upon said shaft, a casing encircling said collar and carried loosely by said shaft, a pair of shoes located between said collar and casing, yielding resistance means exerting pressure upon said shoes and maintaining them yieldingly in contact with the interior of the casing, a pair of rods located at diametrically opposite sides of the shaft and each connected at one end pivotally to the collar, and at its other end pivotally to one of the shoes, for the purpose set forth.

13. The combination with a shaft, of a clutch comprising a collar fixed rigidly upon said shaft, a casing encircling said collar and carried loosely by said shaft, a pair of shoes located between said collar and casing, yielding resistance means exerting pressure upon said shoes and maintaining them yieldingly in contact with the interior of the casing, two pairs of rods, the rods of each pair being pivotally connected at a common point to one of the shoes, and said pairs being located at opposite sides of the shaft, and the opposite ends of said rods being pivotally and slidably connected to the collar.

14. The combination with a shaft, of a clutch comprising a collar fixed rigidly upon said shaft, a casing encircling said collar and carried loosely by said shaft, a pair of shoes located between said collar and casing and disposed at diametrically opposite sides of the shaft with the ends of one shoe separated from the ends of the other shoe and arranged in line therewith, a pair of expansile helical springs located between and exerting a separating pressure upon the ends of said shoes, a pair of rods located at diametrically opposite sides of the shaft and each connected at one end pivotally to the collar, and at its other end pivotally to one of the shoes, for the purpose set forth.

15. The combination with a shaft, of a clutch comprising a collar fixed rigidly upon said shaft, a casing encircling said collar and carried loosely by said shaft, a pair of shoes located between said collar and casing and disposed at diametrically opposite sides of the shaft with the ends of one shoe separated from the ends of the other shoe and arranged in line therewith, a pair of expansile helical springs located between and exerting a separating pressure upon the ends of said shoes, a pair of rods located at diametrically opposite sides of the shaft and each connected at one end pivotally to the collar, and at its other end pivotally to one of the shoes, and means for varying the pressure of said springs.

16. The combination with a shaft, of a clutch comprising a collar fixed rigidly upon said shaft, a casing encircling said collar and carried loosely by said shaft, a pair of shoes located between said collar and casing, yielding resistance means exerting pressure upon said shoes and maintaining them yieldingly in contact with the interior of the casing, a pair of rods located at diametrically opposite sides of the shaft and each connected at one end pivotally to the collar, and at its other end pivotally to one of the shoes, for the purpose set forth.

17. The combination with a shaft, of a clutch comprising a collar fixed rigidly upon said shaft, a casing encircling said collar and carried loosely by said shaft, a pair of shoes located between said collar and casing, and disposed at diametrically opposite sides of the shaft with the ends of one shoe separate from the ends of the other shoe and arranged in line therewith, each of said ends having a socket formed therein, a pair of variable-pressure devices located between and exerting a separating pressure upon the ends of said shoes; each of said pressure devices consisting of a core having a laterally-projecting flange and an axially-projecting teat upon one end, and its opposite end provided with an axial hole, a stud having one end screw-threaded and its other end plane and inserted in said hole, the opposite end of said stud being inserted in one of the sockets in one of the brake-shoes and the teat upon the core being inserted in the socket of the other brake-shoe, a washer carried upon said stud, a nut adapted to vary the position of said washer relatively to the flange upon the core, and an expansile helical spring encircling said core and bearing between said washer and flange.

In testimony whereof I have affixed my signature in presence of two witnesses.

DAVID ALLEN MURPHY.

Witnesses:
FRED J. SEARS,
ALBERT W. BATCHELOR.